(12) United States Patent
Mordeglia et al.

(10) Patent No.: US 10,571,194 B2
(45) Date of Patent: Feb. 25, 2020

(54) APPARATUS FOR HEATING AND TRANSFERRING METAL MATERIALS FOR A MELTING PLANT, AND METHOD FOR MELTING METAL MATERIALS

(71) Applicants: DANIELI & C. OFFICINE MECCANICHE SPA, Buttrio (IT); DANIELI AUTOMATION SPA, Buttrio (IT)

(72) Inventors: Antonello Mordeglia, Bangkok (TW); Stefano Morsut, Udine (IT); Andrea Codutti, Frazione Brazzacco (IT); Fabio Guastini, Dolegna del Collio (IT)

(73) Assignees: DANIELI & C. OFFICINE MECCANICHE SPA, Buttrio (IT); DANIELI AUTOMATION SPA, Buttrio (IT)

( * ) Notice: Subject to any disclaimer, the term of this patent is extended or adjusted under 35 U.S.C. 154(b) by 56 days.

(21) Appl. No.: 15/115,802

(22) PCT Filed: Jan. 29, 2015

(86) PCT No.: PCT/IB2015/050685
§ 371 (c)(1),
(2) Date: Aug. 1, 2016

(87) PCT Pub. No.: WO2015/114563
PCT Pub. Date: Aug. 6, 2015

(65) Prior Publication Data
US 2017/0167792 A1 Jun. 15, 2017

(30) Foreign Application Priority Data
Jan. 31, 2014 (IT) .............................. UD2014A0016

(51) Int. Cl.
*H05B 6/16* (2006.01)
*H05B 6/44* (2006.01)
(Continued)

(52) U.S. Cl.
CPC ............ *F27D 13/002* (2013.01); *C21C 5/527* (2013.01); *C21C 5/5252* (2013.01); *C21C 5/565* (2013.01);
(Continued)

(58) Field of Classification Search
CPC ......... F27D 13/002; H05B 6/06; H05B 6/067; H05B 6/103; H05B 6/104; H05B 6/105;
(Continued)

(56) References Cited

U.S. PATENT DOCUMENTS 3,298,070 A * 1/1967 Yurko ................... C22B 15/006
164/475
3,413,401 A 11/1968 Dillon
(Continued)

FOREIGN PATENT DOCUMENTS

DE 3609329 A1 9/1987
EP 2546592 A1 1/2013
(Continued)

OTHER PUBLICATIONS

International Preliminary Report on Patentability for corresponding application PCT/IB2015/050685 filed Jan. 29, 2015; dated Jan. 27, 2016.
(Continued)

*Primary Examiner* — Hung D Nguyen
(74) *Attorney, Agent, or Firm* — Cantor Colburn LLP

(57) ABSTRACT

Apparatus to heat and transfer mainly metal materials to a melting furnace (12), the apparatus comprising a transporter device (13) configured to move the materials continuously to the melting furnace (12), and at least an induction heating
(Continued)

unit (28) associated with the transporter device (13) and configured to heat by electromagnetic induction the materials moved in the transporter device (13), keeping them in a solid state.

9 Claims, 4 Drawing Sheets

(51) Int. Cl.
| | |
|---|---|
| F27D 13/00 | (2006.01) |
| C21C 5/56 | (2006.01) |
| H05B 6/06 | (2006.01) |
| H05B 6/10 | (2006.01) |
| H05B 6/36 | (2006.01) |
| C21C 5/52 | (2006.01) |
| F27B 3/18 | (2006.01) |
| F27D 3/00 | (2006.01) |

(52) U.S. Cl.
CPC ............. *F27B 3/183* (2013.01); *H05B 6/067* (2013.01); *H05B 6/103* (2013.01); *H05B 6/365* (2013.01); *H05B 6/44* (2013.01)

(58) Field of Classification Search
CPC .. H05B 6/36; H05B 6/365; H05B 6/44; F27B 3/085; F27B 3/12; F27B 3/18; F27B 3/183; F27B 3/28; C21C 5/5252; C21C 5/527; C21C 5/565
USPC ............... 219/653, 654, 656, 662, 671, 655; 373/79, 80, 81, 6, 63, 142, 1, 4, 7, 144
See application file for complete search history.

(56) References Cited

U.S. PATENT DOCUMENTS

| | | | | |
|---|---|---|---|---|
| 4,112,285 | A * | 9/1978 | Pan | B22F 1/0081 |
| | | | | 219/653 |
| 4,187,167 | A * | 2/1980 | Havlik | C10B 7/00 |
| | | | | 201/32 |
| 4,403,327 | A | 9/1983 | Granstrom et al. | |
| 4,797,524 | A * | 1/1989 | Moret | C01B 32/39 |
| | | | | 219/653 |
| 5,055,647 | A * | 10/1991 | Heyes | H05B 6/104 |
| | | | | 219/671 |
| 5,397,877 | A * | 3/1995 | Couffet | F27B 9/067 |
| | | | | 219/671 |
| 6,450,804 | B2 * | 9/2002 | Vallomy | F27B 3/18 |
| | | | | 373/80 |
| 2015/0139267 | A1 * | 5/2015 | Della Vedova | F27B 3/28 |
| | | | | 373/79 |

FOREIGN PATENT DOCUMENTS

| | | |
|---|---|---|
| JP | 06330205 | 11/1994 |
| JP | 8-83676 A * | 3/1996 |

OTHER PUBLICATIONS

International Search Report for corresponding application PCT/IB2015/050685 filed Jan. 29, 2015; dated Jun. 15, 2015.
Written Opinion for corresponding application PCT/IB2015/050685 filed Jan. 29, 2015; dated Jun. 15, 2015.

* cited by examiner

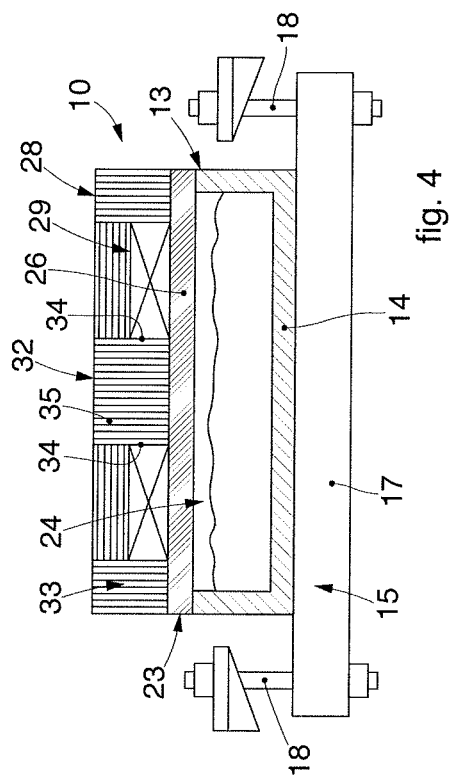
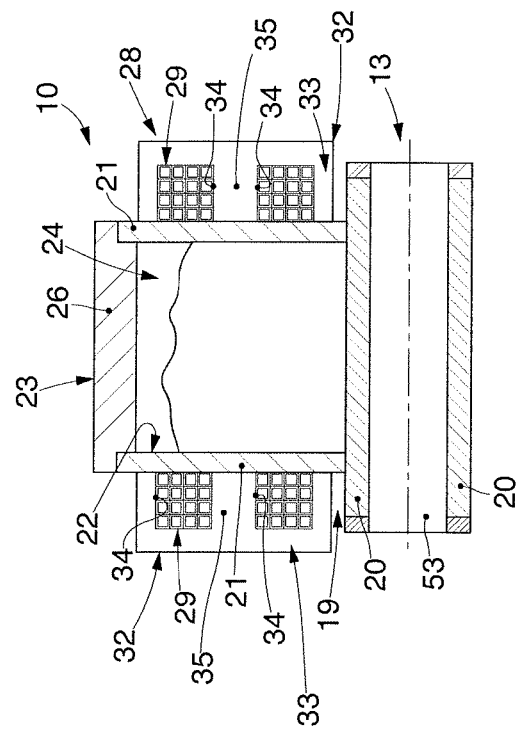
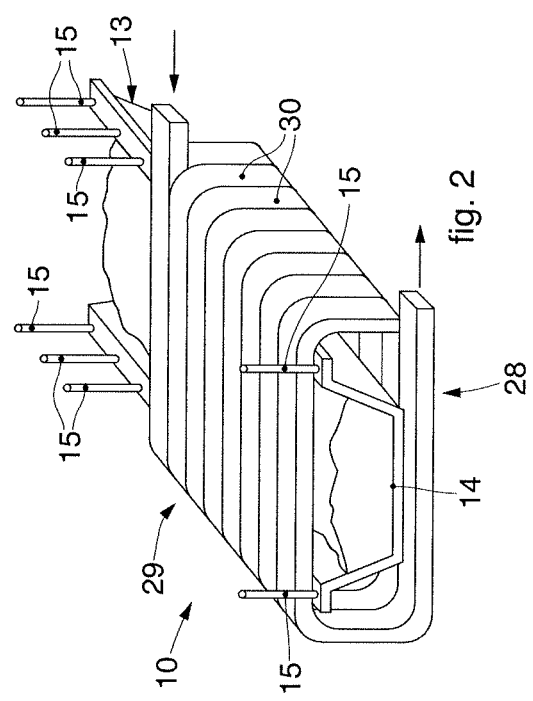
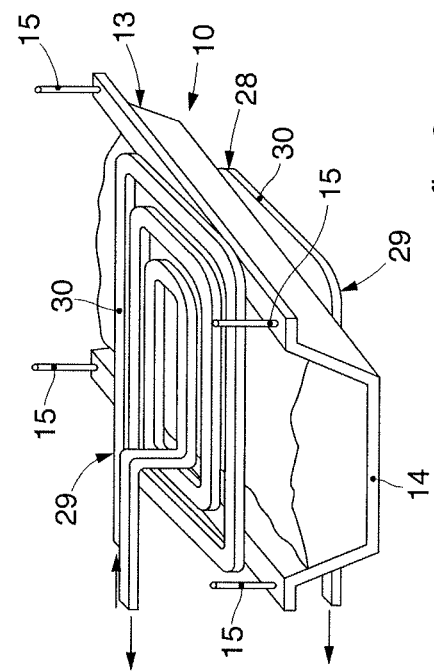

APPARATUS FOR HEATING AND TRANSFERRING METAL MATERIALS FOR A MELTING PLANT, AND METHOD FOR MELTING METAL MATERIALS

FIELD OF THE INVENTION

The present invention concerns an apparatus to heat and transfer metal materials for a melting plant and a melting plant comprising said apparatus.

The heating and transfer apparatus is provided with means to heat the metal materials before they are introduced into a melting furnace.

The present invention can be applied advantageously, although not exclusively, for the production of steel or cast iron.

BACKGROUND OF THE INVENTION

In the field of iron and steel-making, melting containers, also called melting furnaces, for the production of liquid metal, are well known.

Melting furnaces are typically fed with solid materials that contain a high concentration of the metal to be produced. The final composition of the liquid metal is adjusted by adding other metal or non-metallic compounds and very often with materials that have a high carbon content.

Melting and refining furnaces can generally be divided into two types:

electric furnaces that use electric energy as a source of additional energy to the chemical energy generated by the melting processes;

heat furnaces that do not use electric energy and use only heat sources; if additional energy is required in addition to the chemical energy produced by the refining reactions, burners are used for example.

The types of electric furnaces most often used can comprise electric arc furnaces, induction furnaces, resistance furnaces. A variant of electric arc furnaces, with regard to the production of iron alloys, is the submerged arc furnace.

Heat furnaces can comprise oxygen convertors, Martin-Siemens furnaces and cupola furnaces.

After the primary melting step of the metal, a refining step is provided. Usually different alloy materials are added to the molten material, to obtain the required chemical composition.

In all these processes, during the melting and refining steps, all or only some of the materials to be melted can be discharged. The melting and refining steps are also called "power on charging", and correspond to the time during which heat/electric energy is supplied to the melting furnace.

During this step the materials can be loaded into the melting furnace by a conveyor that adjusts the delivery rate thereof.

During the power on charging, the limitation of the delivery rate depends on the requirements of heat energy specific for melting: the higher the specific melting energy required, the lower will be the delivery rate and the productivity of the melting furnace.

In order to reduce the duration of the melting process, it is also known to heat the material before it is loaded into the melting furnace.

One well-known technology for heating the metal material exploits the principle of magnetic induction.

The magnetic induction heating technique is normally used in the fields of melting, heat treatments, molding and welding.

One example application of the magnetic induction heating technique, regarding the melting process of metal materials, is the induction furnace.

An induction furnace can consist of a melting container, usually made of ceramic material, with a cylindrical shape and to which induction heating devices are associated. The induction heating devices normally comprise at least one coil disposed around the melting container, which is powered by alternate current at a suitable frequency. The coil can consist of a tube wound in spirals in which a cooling fluid, usually water, is made to circulate, to preserve the properties of mechanical resistance thereof.

The alternate electric current circulating in the coil generates an alternate induced magnetic field in the melting container and generates induced currents in any conductive metal material that is struck by the magnetic field induced. The currents induced in the conductive metal material in their turn generate heat energy due to the Joule effect.

With regard to the technique of heating a metal mass by induction, the metal product can be heated by means of longitudinal flux induction or transverse flux induction.

In the case of longitudinal flux induction, the coils and magnetic yokes, which make up part of the heating devices, are disposed in such a way as to concentrate the magnetic field induced along the longitudinal development of the material to be heated. In this case the heating of the metal material occurs along the axis of the coil. A similar example of heating the metal material, by the action of the longitudinal magnetic field, is the one which occurs in an induction melting furnace.

In the case of transverse flux induction, the components of the heating device are disposed on opposite sides of the metal material to concentrate the oscillating magnetic field through the material to be heated. In this case, the main heating action occurs on the surface of the metal material.

With regard to the heating of the metal material before it is loaded into a melting furnace, a process and a plant are known, for example from U.S. Pat. No. 4,403,327, in which the scrap or other metal material is first heated by induction in a first container and is then loaded into a second container to be melted, again exploiting the induction principle.

The metal material exiting from the first container is still in a solid state and is transferred to the second container for example by loading baskets.

The loading baskets provide a direct, uncontrolled and immediate feed of the metal material directly into the second container.

This is particularly disadvantageous because it is not possible to suitably and continuously control the ways in which the metal material, inserted into the furnace during the whole melting process, is introduced.

In fact, a continuous control of the quantity of material inserted would prevent the mass of already molten metal from being subjected to drastic reductions in temperature.

U.S. Pat. No. 3,413,401 A describes a vertical receptacle heated by induction means to heat and melt metal material, that is poured in its molten state into a container below.

EP 2.546.592 A1 describes a transport system for metal material to a melting furnace in which there are radiation heating burners along the transporter. Using said radiation burners has the disadvantage that it heats the material only on the surface and, if high temperatures are used, it may lead to the melting of any small-sized material, with consequent sticking and corresponding damage to the transport system and a slow-down in the production cycle.

One purpose of the present invention is to obtain an apparatus to heat and transfer metal materials that allows to reduce the times of the melting cycle.

Another purpose of the present invention is to obtain an apparatus to heat and transfer metal materials, installable in a melting plant, that guarantees to feed the materials in predetermined modes.

Another purpose of the present invention is to obtain an apparatus to heat and transfer metal materials that allows to reduce the complexity of the plant and its manufacture.

Another purpose of the present invention is to perfect a method to heat and transfer metal materials to a melting furnace that allows to reduce the times of the melting cycle.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, an apparatus to heat and transfer mainly metal materials is configured to heat and transport the metal materials to a melting furnace to be subsequently melted.

According to one feature of the invention, the apparatus comprises at least a transporter device configured to move the materials continuously to the melting furnace.

According to another feature of the present invention, the apparatus comprises at least an induction heating unit associated with the transporter device and configured to heat by electromagnetic induction the materials moved by the transporter device, in any case keeping them in a solid state.

With the present invention, therefore, the mainly metal materials are heated before they are introduced into the melting furnace to a temperature such that they are not brought to a molten state, which consequently allows to reduce the times of each melting cycle.

Using the electromagnetic induction heating technique, compared with other known technologies, allows to modulate, both quickly and precisely, the intensity of heating of the materials fed, also depending on the requirements of the process.

Therefore, using this technique, it is possible to guarantee that the materials, even possibly heterogeneous, are heated but remain in a solid state that prevents problems in their movement and prevents damage to the transporter device.

Furthermore, the particular configuration of the heating and transfer apparatus allows to feed the melting furnace with already heated materials and substantially continuously, or in any case in correlation to the specific requirements of the melting process.

Some forms of embodiment of the present invention also concern a melting plant comprising at least a melting furnace in which mainly metal materials are melted, a loading unit configured to feed the materials, and a heating and transfer apparatus as described above which is interposed between the loading unit and the melting furnace.

Other forms of embodiment of the present invention concern a method for melting metal materials that comprises transporting mainly metal materials, by means of a transporter device, continuously to a melting furnace to be subsequently melted.

The method also provides that during the transport of said materials, they are heated by electromagnetic induction, and kept in their solid state.

BRIEF DESCRIPTION OF THE DRAWINGS

These and other characteristics of the present invention will become apparent from the following description of some forms of embodiment, given as a non-restrictive example with reference to the attached drawings wherein:

FIG. 2 is a schematic representation of a possible form of embodiment of a heating and transfer apparatus according to the invention;

FIG. 3 is a schematic representation of a variant form of embodiment of FIG. 2;

FIG. 4 is a schematic representation in cross section of a possible form of embodiment of the heating and transfer apparatus according to the present invention;

FIGS. 5, 6 and 7 are schematic representations of possible variants of FIG. 4;

Figure 1:
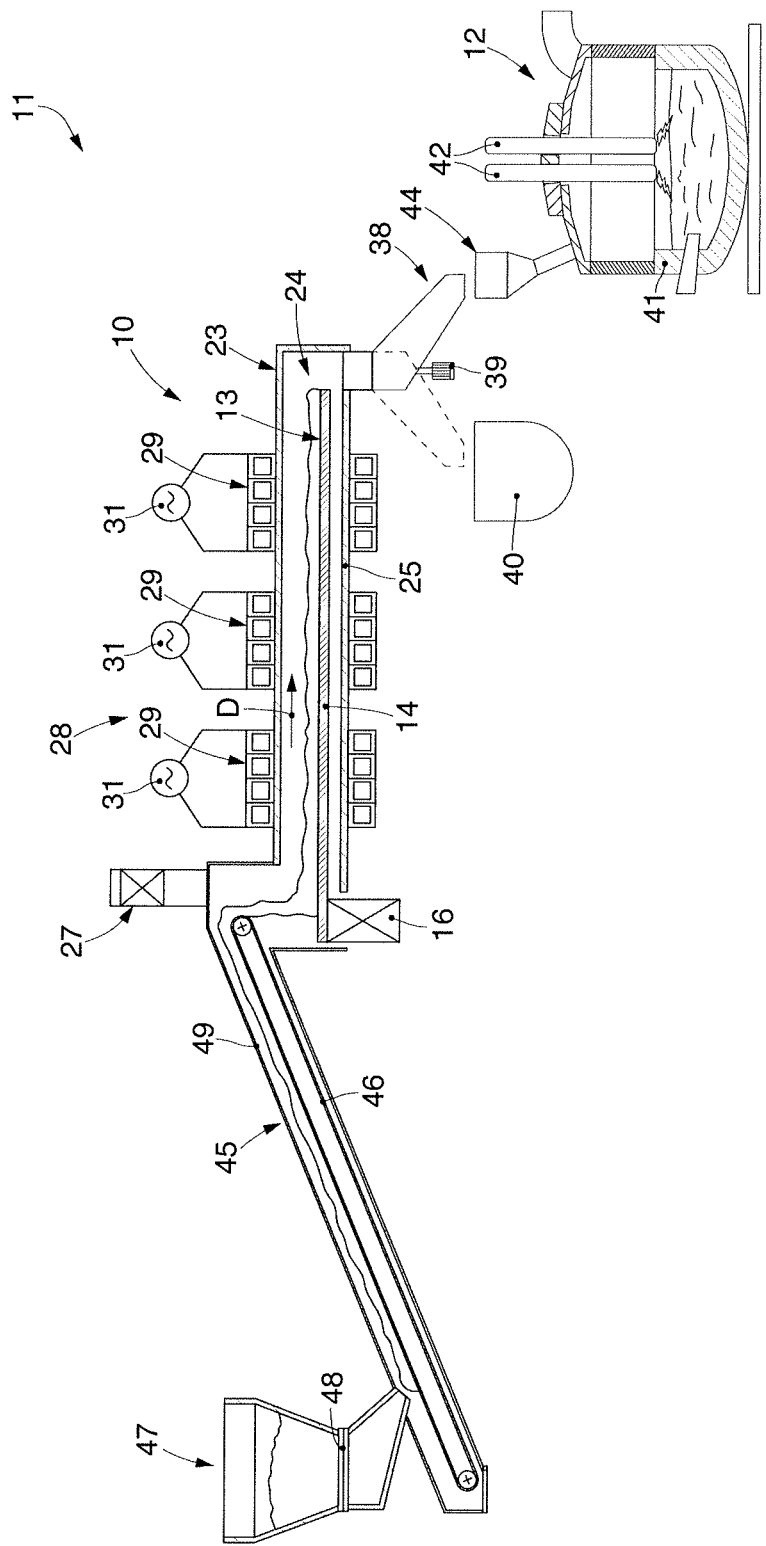
FIG. 1 is a schematic representation of a melting plant for metal materials, comprising a heating and transfer apparatus according to one form of embodiment of the present invention.

To facilitate comprehension, the same reference numbers have been used, where possible, to identify identical common elements in the drawings. It is understood that elements and characteristics of one form of embodiment can conveniently be incorporated into other forms of embodiment without further clarifications.

DETAILED DESCRIPTION OF SOME FORMS OF EMBODIMENT

With reference to FIG. 1, a heating and transfer apparatus, indicated in its entirety by the reference number 10, can be installed in a melting plant 11 configured to melt mainly metal materials and to obtain metal products with a determinate composition.

The mainly metal materials, hereafter referred to generically as materials, can comprise for example scrap fragmented by shearing or grinding and separated from non-metallic contaminants and possible exogenous metals.

The materials can be fragmented into pieces with a size comprised approximately between 50 mm and 100 mm. This level of fragmentation facilitates the transport and metering of the metal material.

The fragmented scrap, possibly also heterogeneous, has a high density of lumps, a high concentration of base metal and uniform sizes from piece to piece. These properties make the fragmented scrap suitable for induction heating.

The materials can also comprise components of alloys suitable to modify the concentration of the final product to be obtained.

The melting plant 11 according to the present invention comprises at least a melting furnace 12 located downstream of the heating and transfer apparatus 10 and configured to melt the materials fed by the heating and transfer apparatus 10.

The heating and transfer apparatus 10 is configured to heat and transfer the material before it is introduced into the melting furnace 12.

According to one feature of the present invention, the heating and transfer apparatus 10 comprises at least a transporter device 13 configured to move the material to the melting furnace 12 in a direction of movement D.

According to another aspect of the present invention, the heating and transfer apparatus 10 also comprises at least an induction heating unit 28 associated with the transporter device 13 and configured to heat by electromagnetic induction the materials moved in the transporter device 13. The entity of heating to which the material is subjected in the heating and transfer apparatus 10 is such as to keep it in a solid state. Merely by way of example, if the material that is heated is scrap iron, the induction heating unit 28 is configured to heat it to a temperature comprised between 300° C. and 800° C.

The transporter device 13 is configured to modify, in a continuous and predetermined manner, the delivery rate of material to the melting furnace 12.

By suitably coordinating the activation of the transporter device 13 it is possible to guarantee feed of the material to the melting furnace 12 either continuously or according to the needs dictated by the individual melting cycle. Furthermore, the heating action exerted by the induction heating unit 28 allows to suitably control the melting process, for example preventing sudden variations in temperature of the liquid bath in the melting furnace 12.

To this purpose, and according to possible solutions, the transporter device 13 can be provided with weight control detectors and/or detectors to control the speed of movement of the materials, in order to determine on each occasion the delivery rate of material.

According to a possible form of embodiment, delivery rate sensors can be connected to the transporter device 13, configured to control the quantity of material that is transported.

The delivery rate sensors can comprise TV cameras, photocells, optical, inductive, capacitive, ultrasound, microwave or radio-frequency sensors.

According to possible forms of embodiment, the transporter device 13 can be chosen from a group comprising a conveyor belt, a plate conveyor belt, a mobile board conveyor, a rotating chamber or a possible combination of the above.

According to possible forms of embodiment, the transporter device 13 is designed so as to satisfy at least one of the following requirements:

ability to preserve the heat energy of the materials transported, limiting the effects of heat dispersion;

to reduce overheating of the structural parts of the transporter device 13 due to the induction heating to which the materials are subjected during movement;

to keep a controlled environment in the transporter device 13, for example to limit the interaction of the materials with air, or to prevent the dispersion of possibly polluting gases into the surrounding environment.

With reference to the forms of embodiment shown in FIGS. 1-4, the transporter device 13 can comprise a mobile board conveyor 14.

According to possible forms of embodiment, the mobile board conveyor 14 can have a mainly longitudinal development in said direction of movement D.

The mobile board conveyor 14 can be defined by a channel having a concave cross section, cradle-type, to contain inside it the materials to be transferred.

According to possible solutions, the transporter device 13 can comprise an actuation member 16 (FIG. 1) connected to the mobile board conveyor 14 and provided to feed the material in the direction of movement D.

The actuation member 16 can be the vibrating type, for example with eccentric masses, and is configured to impart on the mobile board conveyor 14 oscillations in a direction parallel to the direction of movement D of the materials. In particular, the mobile board conveyor 14 is subjected to an acceleration in an opposite direction with respect to the direction of movement of the materials. The materials contained in the mobile board conveyor 14 are subjected, due to their inertia, to sliding on the bottom of the mobile board conveyor 14, in a direction concordant with the direction of movement and feed of the materials to the melting furnace 12.

The actuation member 16 can be attached near the loading or unloading end or in an intermediate position of the longitudinal extension of the mobile board conveyor 14.

According to possible solutions, the mobile board conveyor 14 can be mounted on suspension members 15, configured to support the mobile board conveyor 14 suspended, and to allow it to oscillate as described above and due to the actuation of the actuation member 16.

According to possible implementations, the suspension members 15 can comprise at least one of either tension rods, elastic elements, damping elements, pivoting elements, support plates or possible combinations thereof.

With reference to the forms of embodiment shown in FIGS. 2 and 3, the suspension members 15 can comprise tension rods attached to the peripheral edges of the mobile board conveyor 14 and provided to support the load of the materials transported. First ends of the tension rods are attached to the upper edge of the mobile board conveyor 14 while their opposite ends can be attached to a fixed structure of the transporter device 13. Pivoting elements can be associated with the ends of the tension rods to allow the mobile board conveyor 14 to oscillate.

According to the form of embodiment shown in FIG. 4, the suspension members 15 comprise a support platform 17 configured to support the mobile board conveyor 14, and support members 18 connected to a fixed part of the transporter device 13 and to the support platform 17 and configured to support the latter.

The support platform 17 and/or the mobile board conveyor 14 can comprise guide members provided to guide the oscillation to which the mobile board conveyor 14 is subjected due to the activation of the actuation member 16.

The mobile board conveyor 14, parts of it, or structural components of the transporter device 13 can be made with materials having low magnetic permeability and low electric conductivity. A material with these properties allows to reduce overheating of the structural components due to the heating action of the induction heating unit 28. Merely by way of example, it may be provided to use austenitic stainless steel.

The mobile board conveyor 14 can be associated with cooling devices, for example the water spray or water nebulization type, to preserve the properties of mechanical resistance of the mobile board conveyor 14.

According to possible forms of embodiment, the structural parts of the mobile board conveyor 14 can be coated with a heat-insulating and wear-resistant coating. According to possible forms of embodiment, the heat-insulating coating can be a ceramic or refractory material.

According to possible variant forms of embodiment, instead of a mobile board conveyor, the transporter device 13 can comprise a plate conveyor belt 19 (FIG. 5, 6 or 7) provided to move the materials in the direction of movement D.

The plate conveyor belt 19 can comprise a plurality of plates 20, reciprocally connected to each other and configured to define the bottom of the plate conveyor belt 19 and the support surface of the materials.

The plates 20 are supported by a plurality of rolls 53 on which the plates 20 are moved in the direction of movement D.

Figure 6:
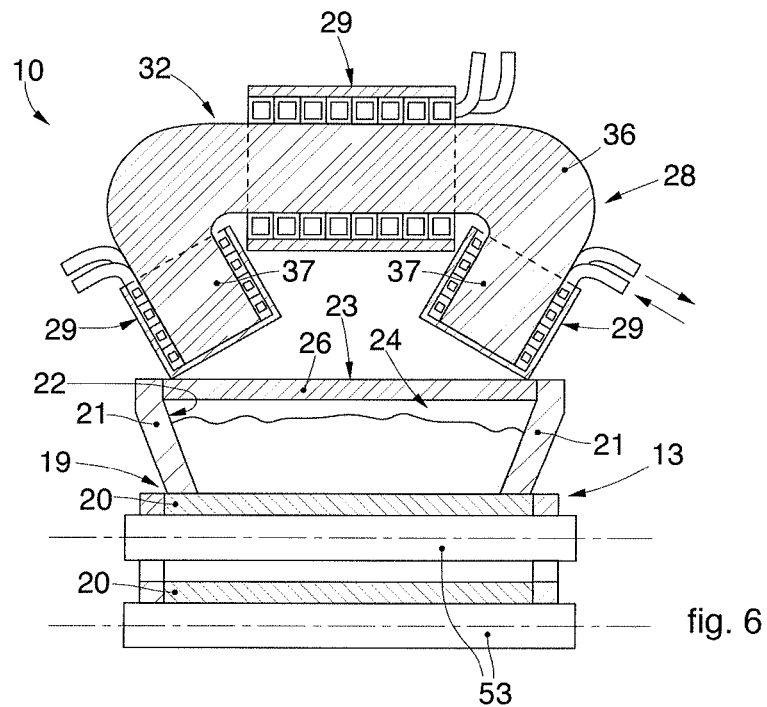
Figure 7:
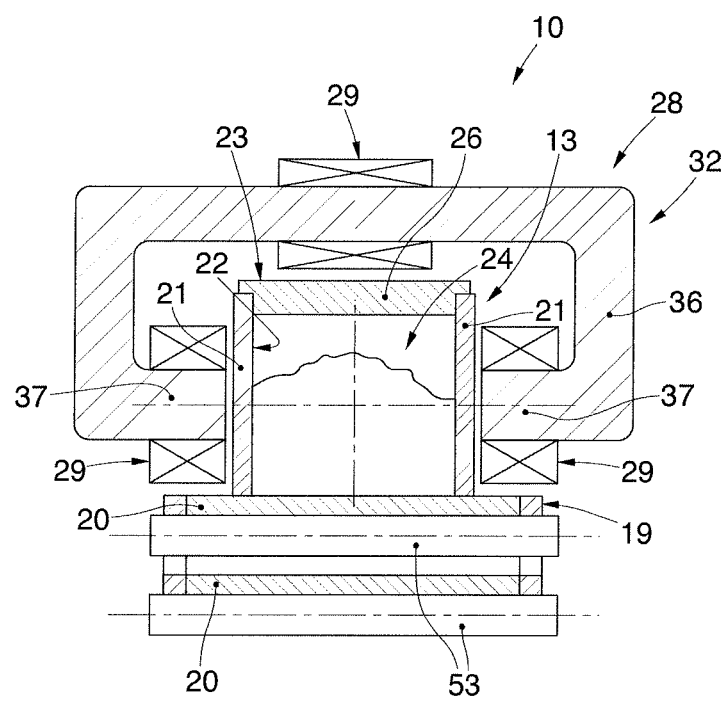

The plates 20 can be substantially flat, as shown for example in FIGS. 5, 6 and 7, or shaped concave, for example U-shaped, where their concavity defines a channel to contain the materials to be transported.

If the plates 20 have a substantially flat shape, the plate conveyor belt 19 can comprise lateral walls 21 disposed near the lateral edges of the plates 20 and defining with them a conveyor channel 22 for the materials to be moved.

According to possible forms of embodiment, the lateral walls 21 can be fixed with respect to the plates 20, for example mounted on a fixed structure of the transporter device 13.

The plates 20 and/or the lateral walls 21 can be made of a material that has a low magnetic permeability and low electric conductivity. Merely by way of example, the plates 20 can be made of austenitic stainless steel.

Cooling devices can be associated with the plates 20 and/or the lateral walls 21, for example the water spray type or the water nebulization type.

According to possible forms of embodiment, the structural parts of the transporter device 13, and possible plates 20 and/or lateral walls 21 can be coated with a heat-insulating and wear-resistant coating. According to possible forms of embodiment, the material of the heat-insulating coating can be a ceramic or refractory material.

According to possible forms of embodiment, a closing body 23 can be associated with the transporter device 13 described with reference to FIGS. 1-7, and is configured to define, either by itself or in combination with parts of the transporter device 13, a closed chamber 24 for the passage of said materials with controlled environment conditions.

In particular, the closing body 23 can be suitable to hermetically close the materials that are moved, and to prevent them from entering into contact with air, which can oxidize the materials moved.

According to possible forms of embodiment (FIG. 1), the closing body 23 can comprise a box-like pipe 25, inside which at least the transporter device 13 is disposed. In this case the pipe 25 itself defines the chamber 24.

According to other forms of embodiment (FIGS. 4-7), the closing body 23 comprises a covering element 26 configured to define, together with the transporter device 13, the chamber 24 that contains the materials.

In particular, with reference to FIG. 4, the covering element 26 is attached to the upper part of the mobile board conveyor 14, to close the concavity defined thereby.

The covering element 26, together with the mobile board conveyor 14, defines the transport volume of the materials.

It is quite evident that in order to guarantee a homogeneous distribution of heat on the metal charge, the height of the bed of materials should be limited and uniform.

According to the forms of embodiment shown in FIGS. 5-7, the covering element 26 is attached to the upper part of the lateral walls 21, to define together with the latter and with the plates 20, the chamber 24 that contains and transfers the materials.

According to possible forms of embodiment, injection devices can be disposed inside the chamber 24, configured to introduce into it a fluid or gas, inert or reducing, suitable to condition the environmental conditions in the chamber 24. This allows to prevent oxidation of the heated materials that are made to transit through the transporter device 13. According to possible solutions, the injection device can comprise a plurality of injectors, installed on the transporter device 13 in different positions along its longitudinal extension.

According to a variant form of embodiment, which can possibly be combined with the forms of embodiment described here, the transporter device 13 can be provided with a suction apparatus 27 configured to generate a depression in the chamber 24 and to contain the oxidation effects of the heated metal transported.

According to possible formulations, the suction apparatus 27 can comprise a fan configured to control the depression inside the chamber 24.

The suction apparatus 27 can be provided with filter elements configured to filter the gases taken in.

The suction apparatus 27 can in turn be connected to an apparatus for treating the gases, suitable to treat the gases taken in.

The closing body 23 can be designed following at least one of the following criteria:

making at least its structural parts using materials with low magnetic permeability, so as to guarantee at least its mechanical seal;

reducing the thicknesses at least of the electrically conductive materials that make up the structural parts of the apparatus;

coating the surfaces of the structural parts potentially exposed to the hot transported materials with insulating materials;

hermetically sealing the connections and interface zones between the different components;

installing the induction heating unit 28 as close as possible to the materials transported.

According to possible forms of embodiment of the present invention, the induction heating unit 28 comprises one or more coils 29 mounted outside the transporter device 13 and suitable to generate an induced magnetic field in the materials.

Each induction heating unit 28 also comprises at least an electric energy generator 31 connected electrically to one or more of the coils 29 to supply them with the electric energy needed to generate the magnetic field.

The electric energy generator 31 can comprise a frequency convertor suitable to vary the frequency and control the current of the coils 29.

According to possible forms of embodiment, the electric energy generator 31 can be configured to supply an alternate electric current with a frequency comprised between 300 Hz and 1,500 Hz. According to a variant form of embodiment, the electric energy generator 31 can be configured to supply an alternate electric current of less than 3,000 Hz.

According to possible formulations of the present invention, and as mentioned above, the heating and transfer apparatus 10 can comprise several induction heating units 28 associated with the transporter device 13 in different positions along the longitudinal extension of the latter. In this way it is possible to differentiate the heating action on the material in the transporter device 13 in different positions of the latter.

This allows to differentiate the entity of the heating along the longitudinal extension, also depending on the quantity of materials contained in the transporter device 13, or in order to determine a gradual heating of the materials.

According to possible forms of embodiment, in order to control the temperature of the materials in the transporter device 13, temperature sensors are associated with the latter.

The temperature sensors can be installed along the walls of the mobile board conveyor 14 or the lateral walls 21 of the plate conveyor belt 19, possibly protruding toward the inside of the coated wall.

According to a possible solution, for example shown in FIGS. 1 and 2, the coils 29 are defined by a plurality of spirals 30 wound around a common axis and disposed near the transporter device 13.

According to possible formulations of the present invention, the coils 29 can be made of an electrically conductive material, for example copper.

The coils 29 can be defined by one or more pipes in which a cooling fluid is made to flow to control the temperature that the material of the coils 29 can reach.

The coil 29 can be formed by a single layer of spirals 30, as shown for example in FIG. 2, or it can comprise several layers, wound one above the other.

According to possible formulations of the present invention, the spirals 30 of the coils 29, or at least some of them, can be attached mechanically to a fixed structure, for example against walls of the transporter device 13, to contain the electromagnetic repulsion forces that act on the coil 29.

According to possible forms of embodiment, the spirals 30 of the coils 29 can be electrically insulated.

The coils 29 can be mounted, with respect to the transporter device 13, so as to generate a magnetic field with:
longitudinal flux lines, that is, parallel to the direction of movement D of the materials (shown for example in FIGS. 1 and 2);
transverse flux lines, that is, transverse with respect to the direction of movement D of the materials (shown for example in FIGS. 3-7).

According to a first form of embodiment, shown for example in FIG. 2, the coil 29 is wound around and externally to the transporter device 13, in this case around the mobile board conveyor 14, and according to a winding axis of the spirals 30 substantially parallel to the direction of movement D. In this form of embodiment, a magnetic field is generated with longitudinal flux lines.

According to another form of embodiment, shown for example in FIG. 3, the induction heating unit 28 comprises at least two coils 29, located facing each other and between which the transporter device 13 is interposed. In particular, the coils 29 are disposed with their winding axes substantially transverse to the direction of movement D of the materials. In this form of embodiment, a magnetic field is generated with transverse flux lines.

According to possible formulations of the present invention, for example shown with reference to FIGS. 4-7, the induction heating unit 28 can comprise at least a magnetic field concentrator device 32 around which said coils 29 are wound. The magnetic field concentrator device 32 is suitable to concentrate the magnetic field toward said materials that are made to advance.

The magnetic field concentrator device 32 can comprise at least one of either concentrators or magnetic yokes.

The magnetic field concentrator device 32 can be made with materials having high magnetic permeability and can therefore increase the overall heat transfer efficiency.

The magnetic field concentrator device 32 can be made with rolled metal sheets configured to reduce the magnetic resistance of the magnetic circuit, or with magneto dielectric materials.

According to a first solution, shown for example in FIG. 4, the magnetic field concentrator device 32 is disposed above the transporter device 13 and is configured to concentrate the magnetic field in a direction orthogonal to the direction of movement of the materials.

In one solution, the magnetic field concentrator device 32 comprises a concentrator body 33 with a mainly longitudinal development and located during use parallel to the direction of movement D.

The concentrator body 33 has an E-shaped cross section, that is, having at least two cavities 34 separated from each other by a ferromagnetic separation portion 35.

A coil 29 is wound on the concentrator body 33 so that the spirals 30 are disposed in the cavities 34 and are wound around the separation portion 35.

By powering the coil 29 electrically, the spirals 30 that make up the coil 29 generate concentrated magnetic field lines that exit from the separation portion 35 in a direction parallel to the winding axis and affect the materials disposed below.

With reference to FIG. 5, another form of embodiment is described comprising at least two magnetic field concentrator devices 32, similar to the one described with reference to FIG. 4.

In particular, in this case the two magnetic field concentrator devices 32 are disposed facing each other, and the transporter device 13 is interposed between them. In the solution shown in FIG. 5, each magnetic field concentrator device 32 is located laterally adjacent to the lateral walls 21 of the mobile board conveyor 14. Both the magnetic field concentrator devices 32 are configured to emit respective magnetic field fluxes substantially parallel to each other and orthogonal in turn to the direction of movement D of the materials.

According to other forms of embodiment of the present invention, for example shown in FIGS. 6 and 7, the magnetic field concentrator devices 32 comprise a yoke 36 made of ferromagnetic material around which the coils 29 are wound.

According to the forms of embodiment in FIGS. 6 and 7, the yoke 36 of ferromagnetic material is substantially C-shaped, or has a substantially C-shaped cross section.

During use, the ends of the yoke, also called polar ends 37, face toward the metal materials present in the transporter device 13.

The spirals 30 of the coils 29 can be suitably protected by installing a magnetic screen acting as a concentrator to increase the induction efficiency.

According to the solution shown in FIGS. 6 and 7, two coils 29 are disposed each near one of the polar ends 37 and another coil 29 is located in an intermediate position of the longitudinal extension of the yoke 36.

FIG. 6 shows a solution where both the polar ends 37 are disposed above the materials that are moved.

FIG. 7 instead shows a solution where the polar ends 37 are disposed laterally to the transporter device 13 and each facing one of the lateral walls 21.

Figure 8:
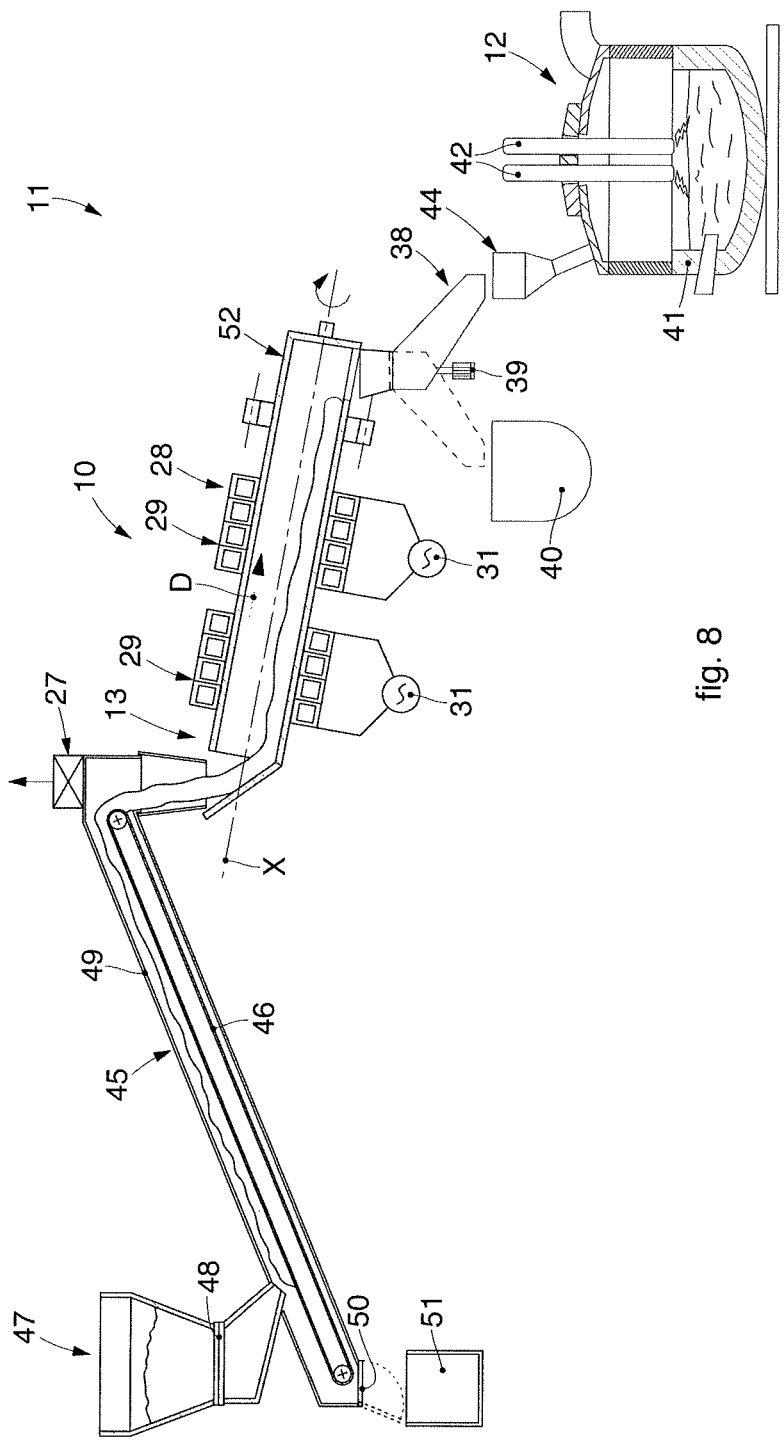
FIG. 8 is a schematic representation of a variant form of embodiment of FIG. 1.

According to possible forms of embodiment, shown for example with reference to FIGS. 1 and 8, between the heating and transfer apparatus 10 and the melting furnace 12 an introduction member 38 is interposed, configured to allow the introduction of the heated material into the melting furnace 12.

The introduction member 38 can comprise for example a slide, located above the melting furnace 12 and that allows the heated material to be discharged through gravity to the melting furnace 12.

According to possible forms of embodiment, the introduction member 38 can be connected to a selector device 39 provided to take the introduction member 38 at least to a first operating position to discharge the material into the melting furnace 12 and a second operating position.

The second operating position of the introduction member 38 can correspond to a position of non-interference of the latter with mobile parts of the melting furnace 12, such as for example the roof that covers the shell of an electric furnace.

According to a variant form of embodiment, for example shown in FIG. 1, the second operating position of the introduction member 38 corresponds to a discharge position of the material into an auxiliary container 40.

If it is not possible to discharge it into the melting furnace 12, for example due to process requirements or conditions connected to the momentary suspension of the melting process, the heated material is discharged into the auxiliary container 40 so as to allow it to be possibly reintegrated later into the melting process, for example in the heating and transfer apparatus 10.

The transporter device 13 can be served by monitoring devices provided to detect at least a blocked condition of the material transported, breakdown of the mechanical components, volumetric quantity of the material transported, weight of the material transported.

The monitoring devices can comprise photocells, TV cameras, optical, inductive, magnetic or similar sensors, possibly controlled and managed by a control unit.

According to the form of embodiment shown in FIGS. 1 and 8, the melting furnace 12 comprises an electric arc furnace 41 provided with electrodes 42 to supply electric power and injection devices 43 to introduce gas, preferably oxygen able to promote the melting and refining reactions.

The electric arc furnace 41 can be provided with introduction means 44 configured to allow the insertion of the heated material.

In particular, the introduction means 44 can comprise a pipe, a hopper, vibrating devices or combinations thereof.

According to possible forms of embodiment, which can possibly be combined with the forms of embodiment described here, the melting plant 11 according to the present invention can also comprise a loading unit 45 located upstream of the heating and transfer apparatus 10 and configured to feed the materials to be heated and transported to the latter.

The loading unit 45 can comprise at least one of either a conveyor belt, plate conveyor belt, loading basket, hopper, grab crane, bridge crane or possible combinations thereof.

According to possible forms of embodiment, for example shown in FIGS. 1 and 8, the loading unit 45 comprises a conveyor belt 46 and a loading hopper 47 configured to load a determinate quantity of scrap onto the conveyor belt 46.

The loading hopper 47 can possibly be provided, in correspondence with a discharge aperture, with a vibrating feeder to meter the quantity of material discharged onto the conveyor belt 46 and hence to control the delivery rate of material discharged into the heating and transfer apparatus 10.

The loading hopper 47 can possibly be served by opening/closing devices 48, such as for example a guillotine valve.

The delivery rate of material can be controlled by modifying the frequency of vibration of the vibrating feeder, also according to possible detections that can be made on the conveyor belt 46. In particular, it can be provided to control the weight and/or volume, by means of suitable detectors installed on the conveyor belt 46.

In possible formulations of the present invention, the conveyor belt 46 can be at least partly contained in a containing body 49, or housing, to contain the quantity of material that is transferred.

On the opposite side to where the materials are discharged into the heating and transfer apparatus 10, the containing body 49 is provided with an auxiliary discharge aperture 50, able to be selectively opened/closed, to discharge the materials into a discharge container 51 instead of into the heating and transfer apparatus 10.

It is clear that modifications and/or additions of parts may be made to the heating and transfer apparatus 10 as described heretofore, without departing from the field and scope of the present invention.

For example, as shown in FIG. 8, the transporter device 13 can comprise a rotary drum 52, selectively rotatable around an axis of rotation X parallel to the direction of movement D of the materials.

The rotary drum 52 is hollow inside to contain inside it the materials to be transferred to the melting furnace 12.

The materials are loaded in correspondence with a first end of the rotary drum 52 and, by rotation of the latter, the forward motion of the materials is defined, in the direction of movement D.

According to possible forms of embodiment, the rotary drum 52 can be provided inside with blades configured to determine the forward motion of the materials.

According to a possible form of embodiment, the rotary drum 52 is disposed inclined, so as to present its introduction end for the materials higher than the discharge end. This allows to define a forward motion of the materials simply due to the effect of gravity.

By suitably controlling the angle of inclination of the rotary drum 52 and its speed of rotation, it is possible to control the delivery rate of materials that are fed to the melting furnace 12.

The rotary drum 52 can be made of metal materials having a low magnetic permeability and low electric conductivity. Merely by way of example, the material that the structural part of the rotary drum 52 is made of can preferably be austenitic stainless steel coated with heat-insulating materials, preferably refractory.

In this form of embodiment the induction heating unit 28 comprises at least one coil 29, in this case two coils 29, wound in spirals outside and around the rotary drum 52. In particular, the coils 29 are disposed distanced from each other along the length of the rotary drum 52 in order to control, in a differentiated manner, the heating action to which the latter will be subjected during normal functioning.

The coils 29 can be substantially similar to what we described with reference to the previous forms of embodiment.

In this case too, the coils 29 are each connected to electric energy generators 31, to generate in the materials that are fed forward an induced magnetic field and respective induced currents suitable to heat the materials.

It can be provided that the rotary drum 52 is also provided with other supplementary sources of heat, for example of the chemical type such as for example burners.

It is also clear that, although the present invention has been described with reference to some specific examples, a person of skill in the art shall certainly be able to achieve many other equivalent forms of heating and transfer apparatus 10 for metal materials, having the characteristics as set forth in the claims and hence all coming within the field of protection defined thereby.

The invention claimed is:

1. A melting plant comprising a melting furnace in which to melt metal materials, a loading unit configured to feed said materials, and a heating and transfer apparatus, said heating and transfer apparatus being interposed between said loading unit and said melting furnace and being configured to heat and move said materials, fed by said loading unit, to said melting furnace, at a temperature comprised between 300° C. and 800° C. and keeping them in a solid state, wherein the heating and transfer apparatus comprises:

a transporter device configured to move said materials continuously to said melting furnace, wherein said transporter device is chosen from a group comprising a transporter belt, a plate transporter belt, a mobile board transporter, a rotating chamber or a possible combination of the above, wherein said transporter device is provided with a closed chamber for the passage of said metal materials; and a plurality of induction heating units, each of the induction heating units comprising at least one coil mounted externally to said transporter device and suitable to generate an induced magnetic field in said materials in order to heat by electromagnetic induction said materials, moved in said transporter device, to a temperature between 300° C. and 800° C. and keeping them in a solid state, wherein the induction heating units associated with the transporter device are provided in different positions along the longitudinal extension of the transporter device, configured to differentiate the heating action on the material in the transporter device in different positions of the latter, wherein said transporter device comprises a mobile board transporter with a mainly longitudinal development, defined by a channel with a cradle-type concave cross section, to contain the metal material inside it and associated with an actuation member of the vibrating type, and wherein the closed chamber comprises a closing body configured to hermetically enclose the metal materials during said passage; and the melting plant further comprising a suction apparatus configured to reduce a pressure within the closed chamber.

2. The melting plant as in claim 1, wherein structural components of said transporter device are made with materials having low magnetic permeability and low electric conductivity.

3. The melting plant as in claim 1, wherein said coil is defined by a plurality of spirals, where at least some of the spirals, are attached mechanically against walls of said transporter device, to contain the electromagnetic repulsion forces that act on the coil.

4. The melting plant as in claim 1, wherein said coil is wound around to said transporter device and according to a winding axis substantially parallel to a direction of movement of said materials.

5. The melting plant as in claim 1, wherein said induction heating unit comprises at least two coils located facing each other and between which said transporter device is interposed, said coils being disposed with their winding axes substantially transverse to a direction of movement of said materials.

6. The melting plant as in claim 1, wherein said induction heating unit comprises a magnetic field concentrator device around which said at least one coil wind, said magnetic field concentrator device being suitable to concentrate the magnetic field toward said materials.

7. The melting plant as in claim 6, wherein said induction heating unit comprises at least two magnetic field concentrator devices disposed facing each other, said transporter device being interposed between said magnetic field concentrator devices.

8. The melting plant as in claim 1, wherein the body is configured to control environment conditions within the closed chamber.

9. The melting plant as in claim 1, wherein said transporter device comprises a rotating drum hollow internally so as to contain said materials inside it, said rotating drum being rotatable around an axis of rotation parallel to the direction of movement of said materials.

* * * * *